United States Patent
Gerber et al.

(10) Patent No.: US 11,512,750 B2
(45) Date of Patent: Nov. 29, 2022

(54) ELECTROMECHANICAL BRAKE APPARATUS AND SYSTEM WITH GEARLESS INPUT FROM MOTOR

(71) Applicant: ZF ACTIVE SAFETY US INC., Livonia, MI (US)

(72) Inventors: Kraig E. Gerber, Plymouth, MI (US); Galus Chelaidite, South Lyon, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 363 days.

(21) Appl. No.: 16/835,399

(22) Filed: Mar. 31, 2020

(65) Prior Publication Data

US 2021/0301892 A1   Sep. 30, 2021

(51) Int. Cl.
| | |
|---|---|
| *F16D 55/08* | (2006.01) |
| *F16D 65/18* | (2006.01) |
| *F16D 55/22* | (2006.01) |
| F16D 121/24 | (2012.01) |
| F16D 125/36 | (2012.01) |

(52) U.S. Cl.
CPC ............. *F16D 65/18* (2013.01); *F16D 55/22* (2013.01); *F16D 2121/24* (2013.01); *F16D 2125/36* (2013.01)

(58) Field of Classification Search
CPC ............. F16D 2125/36; F16D 2125/38; F16D 2121/24; F16D 65/567; F16D 65/18; F16D 55/22; B60T 13/74; B60T 13/741
See application file for complete search history.

(56) References Cited

U.S. PATENT DOCUMENTS

| | | | | |
|---|---|---|---|---|
| 6,311,807 B1 * | 11/2001 | Rinsma | ................. | F16D 65/567 188/71.9 |
| 2013/0087419 A1 * | 4/2013 | Beier | ...................... | F16D 51/00 188/106 F |
| 2021/0300310 A1 * | 9/2021 | Gerber | ................. | F16D 65/183 |
| 2021/0301889 A1 * | 9/2021 | Gerber | ................. | B60T 13/746 |

FOREIGN PATENT DOCUMENTS

| | | | | |
|---|---|---|---|---|
| DE | 10158762 A1 * | 6/2003 | ............. | F16D 65/18 |
| EP | 1054180 A2 * | 11/2000 | ............. | F16D 65/18 |

OTHER PUBLICATIONS

Abstract of DE 10158762 (no date).*
Abstract of EP 1054180 (no date).*

* cited by examiner

*Primary Examiner* — Nicholas J Lane
(74) *Attorney, Agent, or Firm* — Tarolli, Sundheim, Covell & Tummino LLP (57) ABSTRACT

An electromechanical brake apparatus includes a housing supporting an inboard brake pad and an oppositely facing outboard brake pad for selective frictional contact with a rotor interposed longitudinally therebetween. The housing includes a mechanism cavity located longitudinally between the inboard pad and a motor having a motor output shaft. An adjuster ramp assembly indirectly receives torque from the motor. A spindle is operatively connected with the adjuster ramp assembly to indirectly receive torque from the motor therethrough. A leading ramp assembly is configured to transmit applied torque from the motor to the adjuster ramp assembly. The leading ramp assembly receives stepped-up torque from the motor via the motor output shaft and a ball thrust bearing at least partially located radially between the motor output shaft and an actuator ramp of the leading ramp assembly.

15 Claims, 10 Drawing Sheets

ELECTROMECHANICAL BRAKE APPARATUS AND SYSTEM WITH GEARLESS INPUT FROM MOTOR

TECHNICAL FIELD

This disclosure relates to an apparatus, system, and method for use of an electromechanical brake and, more particularly, to a method, system, and apparatus of an electromechanical brake including gearless input from a motor.

The present application relates to co-pending patent applications entitled "Electromechanical Brake Apparatus and System with Adjustment Features" (U.S. application Ser. No. 16/835,438) and "Electromechanical Brake Apparatus and System with Planetary Gear" (U.S. application Ser. No. 16/835,361), which are filed concurrently herewith and incorporated by reference for all purposes.

BACKGROUND

Vehicle brake systems typically have a service brake that has service brake apply modes and a parking brake system that has parking brake apply modes. During a service brake apply hydraulic pressure is applied to move a piston. In recent systems, during a parking brake apply, an electric motor and drive mechanism moves the piston to create the parking brake apply by pressing one or more brake pads against a brake rotor. Once the parking brake apply is complete, the electric motor is turned off. Typically, several gear and/or belt stages and a rotary to linear stage (e.g., lead screw) are located between the piston and the motor.

SUMMARY

In an aspect, an electromechanical brake apparatus is described. A housing supports an inboard brake pad and an oppositely facing outboard brake pad for selective frictional contact with a rotor interposed longitudinally therebetween. The housing includes a mechanism cavity located longitudinally between the inboard pad and a motor having a motor output shaft. An adjuster ramp assembly indirectly receives torque from the motor. A spindle is provided for selectively moving the inboard brake pad longitudinally. The spindle is operatively connected with the adjuster ramp assembly to indirectly receive torque from the motor therethrough. The spindle and adjuster ramp assembly are located substantially within the mechanism cavity. A leading ramp assembly is configured to transmit applied torque from the motor to the adjuster ramp assembly. The leading ramp assembly receives stepped-up torque from the motor via the motor output shaft and a ball thrust bearing at least partially located radially between the motor output shaft and an actuator ramp of the leading ramp assembly. A predetermined amount and direction of torque is applied to each of the adjuster ramp assembly and the leading ramp assembly to assist with a selected one of (1) service brake application and (2) service brake release functions. The electromechanical brake apparatus is operative, at different times, for both functions.

BRIEF DESCRIPTION OF THE DRAWINGS

For a better understanding, reference may be made to the accompanying drawings, in which.

This application includes an appendix that forms an integral part of this application. Appendix A provides an example implementation.

Description of Aspects of the Disclosure

Unless defined otherwise, all technical and scientific terms used herein have the same meaning as is commonly understood by one of ordinary skill in the art to which the present disclosure pertains.

As used herein, the singular forms "a," "an", and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on," "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on," "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under," "below," "lower," "over," "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

Figure 1:
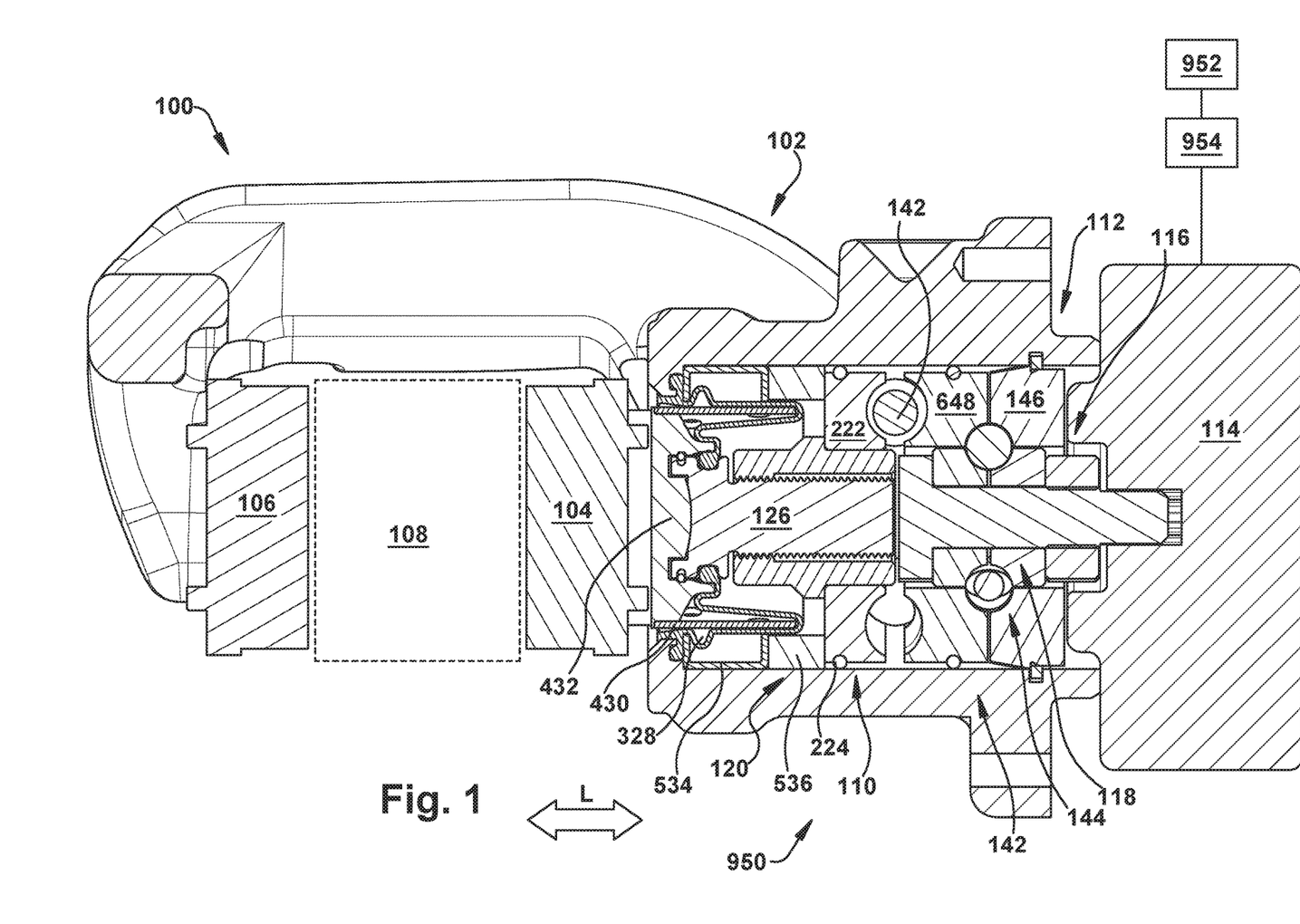
FIG. 1 is a schematic side view of an electromechanical brake apparatus.

FIG. 1 depicts an electromechanical brake apparatus 100 for use as a service and/or parking brake, comprising a housing 102 directly or indirectly supporting an inboard brake pad 104 (e.g., via the use of a bracket, not shown) and an oppositely facing outboard brake pad 106 for selective frictional contact with a rotor (shown schematically at 108) interposed longitudinally therebetween. An electromechanical brake apparatus 100 generally is an all-electric caliper that performs service and/or parking brake events. The housing 102 includes a mechanism cavity 110 located longitudinally between the inboard pad 104 and a motor 114, which could, for example, be a brushless direct current motor ("BLDC") or axial flux motor.

Unlike known electromechanical brake apparatuses, the electromechanical brake apparatus 100 shown in FIG. 1 has no gears mechanically interposed between an output shaft 118 of the motor 114 and the inboard pad 104 to step up or alter the output torque from the motor 114 to reduce the rotation speed and/or increase the torque provided to the electromechanical brake apparatus through a suitable input. Instead, in the present electromechanical brake apparatus 100, the motor 114 connects directly to the electromechanical brake apparatus 100 via a motor output shaft 118 and a thrust bearing 144. The motor output shaft 118 interacts with the thrust bearing 144 to provide torque (used herein to indicate rotationally oriented motive power) having a predetermined magnitude, speed, and rotation direction to an leading ramp 648 of an leading ramp assembly 140 for use by other components of the electromechanical brake apparatus. Thus, the adjuster ramp assembly 120 indirectly receives torque from the motor 114 through the leading ramp assembly 140 and one or more ramp balls 142, as will be discussed below. (Though the present description references the transfer of "torque" for the sake of description, it is contemplated that a non-angled force or load could also or instead be developed between components of the electromechanical brake apparatus 100, and that the "torque" transfer language used herein could also encompass a situation where a non-torque force is at least partially involved.)

Figure 2:
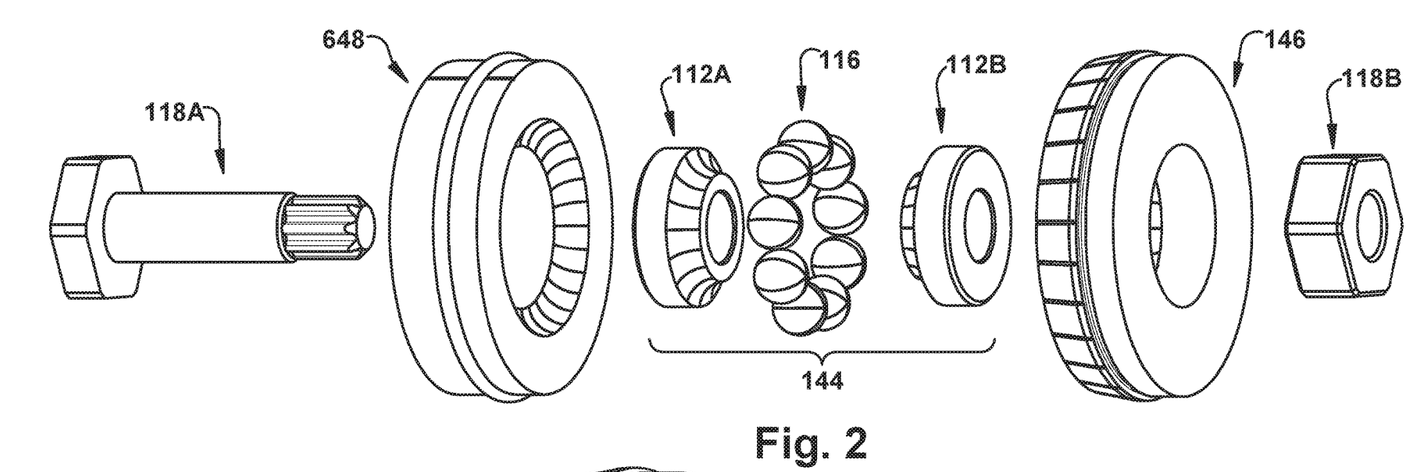
FIG. 2 is an exploded partial view of components of the electromechanical brake apparatus of FIG. 1.

FIG. 2 depicts an exploded view of the gearless unit 538 of the electromechanical brake apparatus 100 that transfers torque from the motor 114 to the leading ramp 648. As one of ordinary skill in the art will understand from the Figures, the output shaft 118 is actually a two-piece "bolt and nut" construct comprised of shaft bolt 118A and shaft nut 118B, and the end of the shaft bolt 118A which protrudes past the shaft nut 118B is splined, as shown in FIG. 2, to mate in a male-to-female manner with an interior-splined portion of the motor 114 and thus receive torque therefrom. The relative distance between the head of shaft bolt 118A and shaft nut 118B controls the distance between the thrust bearing 144 first and second races 112A and 112 B respectively. The leading ramp 648 itself also serves a torque-amplifying function, as a component of the power transmission assembly, in a manner that was provided by gears in prior art devices.

The thrust bearing 144 comprises first and second races 112A and 112B, respectively, and at least one thrust ball 116.

Figure 3:
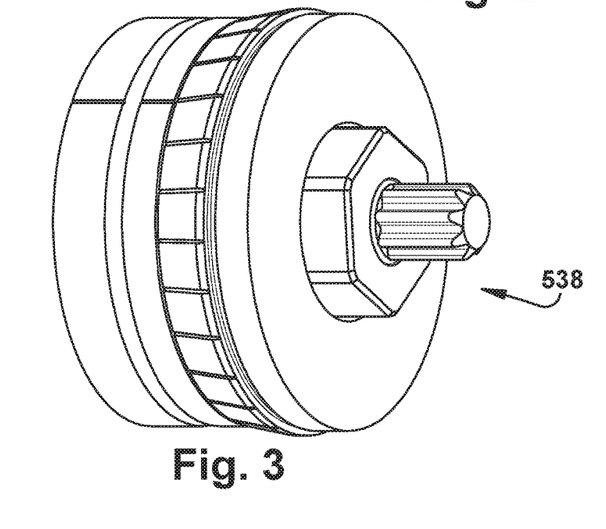
FIG. 3 is an assembled view of the components of FIG. 2.
Figure 4A:
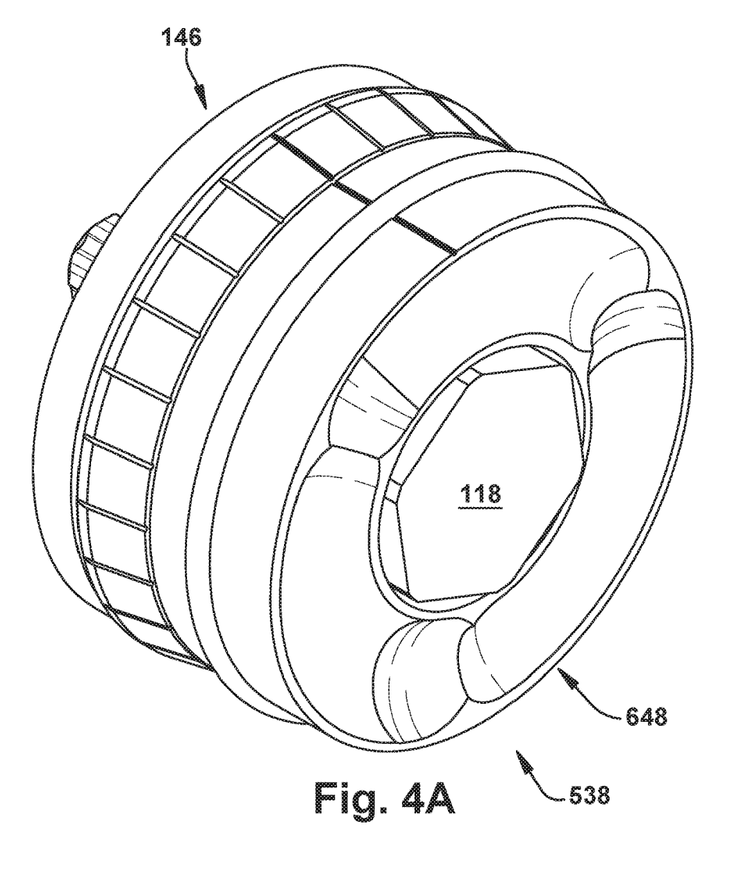
FIGS. 4A-4B are perspective views depicting rotation options for the components of FIG. 2.
Figure 4B:
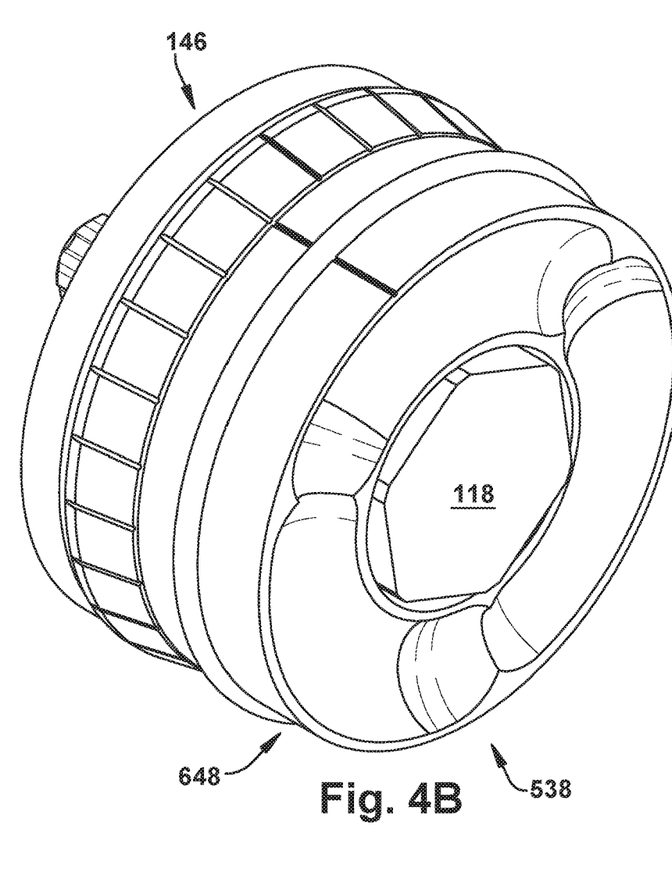

The gearless unit 538 is shown in assembled view in FIG. 3. FIGS. 4A-4B depict schematically the manner in which the gearless unit 538 can be used to transform a high speed, low torque output from the motor 114 into a low speed, high torque to drive the leading ramp 648. As is shown by the thickened line superimposed on the gearless unit 538, the output shaft 118 makes a plurality of rotations, with torque transmitted through the thrust bearing 144 to the leading ramp 648, in order to achieve a relatively small rotation (one unit, as shown by the thickened line) of the leading ramp 648 relative to the support 146. The torque transmitted from output shaft 118 by the thrust bearing 144 to leading ramp 648 is possible due at least one of spring 536 and to increasing clamp force during service brake apply events, which ensures that the gearless gearbox system 112 maintains its gear ratio, and no slipping occurs between its constituent races (i.e. first and second races 112A and 112B respectively, and leading ramp 648 and support 146) and/or the one or more thrust ball 116.

Figure 5A:
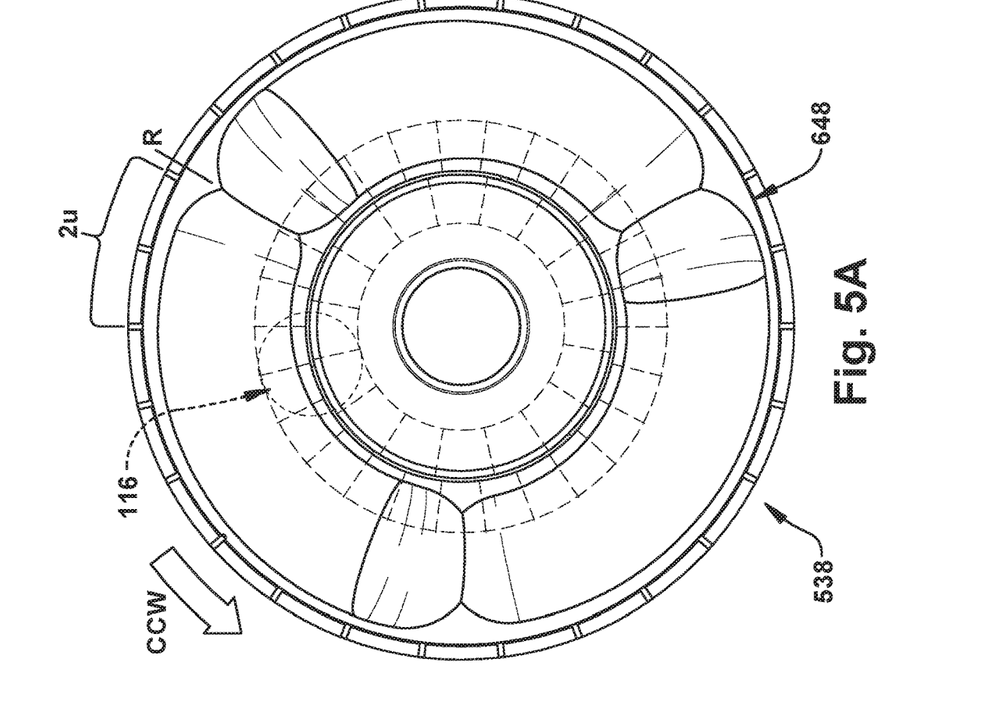
FIGS. 5A-5B are front views depicting rotation options for the components of FIG. 2.
Figure 5B:
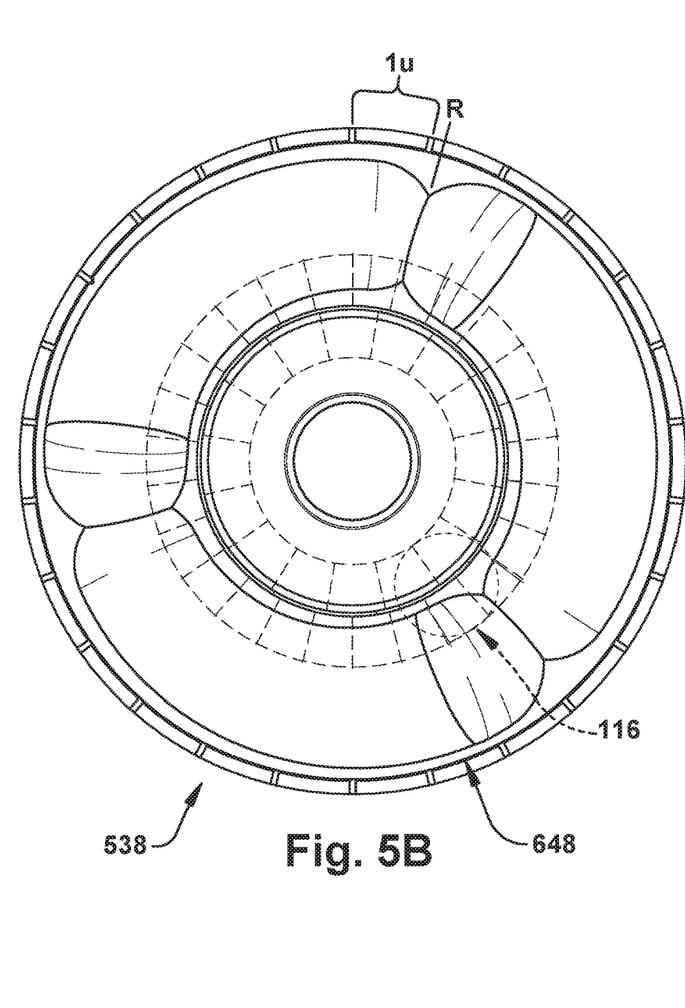

The ratio of output shaft 118 rotation to leading ramp 648 rotation can vary (due to factors including, but not limited to, deflection of the races during use and manufacturing tolerances for the races and balls) and may be selected by one of ordinary skill in the art for a particular use environment of the electromechanical brake apparatus. For example, and as shown in the sequence of FIG. 5A-5B, an example thrust ball 116 is initially located substantially at a 12 o'clock position with respect to leading ramp 648. A reference point R of the leading ramp 648 is located just past two units ("2U") clockwise of the 12 o'clock position at the starting position shown in FIG. 5A. In FIGS. 5A-5B, the output shaft 118 is presumed to be rotating sufficiently to send the thrust ball 116 counterclockwise, shown by arrow CCW in FIG. 5 A. However, one of ordinary skill in the art can appreciate that the direction and magnitude of rotation of any of the components of the electromechanical brake apparatus 100 can be selected for a particular use environment. The races can be used in aspects of the present invention to provide a "gearless gearbox" to facilitate torque transmission at a desired ratio by using information (e.g., location) regarding contact between any desired number and configuration of bearing balls and any desired number and configuration of races.

Turning now to FIG. 5 B, the thrust ball 116 has rotated counterclockwise to approximately a 5 o'clock position. By virtue of that rotation, the leading ramp 648 has also been driven counterclockwise, but by only approximately one unit, ending in a location that is just past one unit ("1 U") clockwise of the 12 o'clock position. Through this simple example, one of ordinary skill in the art will appreciate that the thrust bearing 144 and other components of the gearless unit 538 can be designed to have desired contact geometries, internal friction forces, clamp forces, and other characteristics sufficient to achieve desired brake clamp force without the use of gears in the electromechanical brake apparatus 100. The thrust balls 116 can be thought of as acting as "planets" to amplify the motor torque to the desired ball ramp torque which is in turn used to achieve a desired amount of clamp force by the electromechanical brake apparatus 100. The replacement of gears with ball bearings can help to reduce sound generated during use and/or can result in manufacturing cost and other types of savings. However, it should be appreciated that the "gear ratio" of torque adjustment developed by the gearless unit 538 may be somewhat sensitive to the final location of contact points between the bearing ball(s) (e.g., thrust balls 116) and the race components in relationship with each other.

Therefore, location control for those components can be designed into the gearless unit 538 through the use of techniques such as tight manufacturing tolerances, precision/matched assembly and adjustment, control software tuning, motor 114 performance, or any other desired adjustment factors, both initially and over the life of the electromechanical brake apparatus 100, particularly as components thereof begin to degrade. One of ordinary skill in the art will be able to design a suitable gearless unit 538 and other components in order to provide desired brake clamping force without the use of gears between the motor 114 and the inboard and/or outboard brake pads 104 and 106.

With reference to FIG. 1, the leading ramp assembly 140 receives stepped-up torque from the motor 114 via output shaft 118 and the thrust bearing 144. An adjuster ramp assembly 120 indirectly receives torque from the motor 114, such as via the output shaft 118. The adjuster ramp assembly 120 may include, for example, an adjuster ramp 222 and an o-ring 224 for sealing. A threaded or unthreaded spindle 126, which could be, e.g., a rod may be provided for selectively moving the inboard brake pad 104 longitudinally. For example, the spindle 126 could be threadably connected with the adjuster ramp assembly 120 for longitudinal motion therewith, and on the other side, via flange 432 which may be substantially prevented from rotation by inboard pad 104; the spindle 126 may be likewise prevented from rotating under certain use conditions. The spindle 126 may be operatively connected with the adjuster ramp assembly 120 to indirectly receive torque from the motor 114 therethrough. The spindle 126 and adjuster ramp assembly 120 are located substantially within the mechanism cavity 110.

As shown in at least FIG. 1, a boot 328 may be located longitudinally between the inboard pad 104 and the adjuster ramp assembly 120. The term "longitudinally" is used herein to indicate a direction parallel to arrow "L" in the Figures, or the left-right direction in the orientation of FIG. 1. The boot 328, when present, substantially prevents ingress of material into the mechanism cavity such as, for example, by sealing against an open end of the mechanism cavity 110 and preventing dirt, debris, and moisture from traveling from a location adjacent the inbound pad 104 and into the mechanism cavity 110. In some use environments, the radial spacing between the ID (sealing on the spindle 126) is to reduce the volume of air between new and worn pads. If this volume is reduced to or below a predetermined level, then vacuum generated inside the hermetically closed mechanism cavity 110 will also be desirably low.

As shown in FIG. 1, a shield 430 may be interposed longitudinally between the boot 328 and the inboard pad 104. When present, the shield 430 may be connected to the spindle 126, such as via flange 432, for longitudinal travel therewith. The shield 430 facilitates egress of material from longitudinally between the boot 328 and the inboard pad 104. The shield 430 may also serve as desired to stiffen the boot 328. The culmination of the boot 328 in the shield 430 may help prevent stone entrapment between the flange 432 and other components of the electromechanical brake apparatus 100, protect the boot 328 from stone damage and puncture, and/or allow (muddy) water and debris to flow in a desirable "draining" direction for removal from the electromechanical brake apparatus 100 via gravity. Particularly when the shield 430 lacks drain holes, the boot 328 may include a lip seal feature to interface with the shield 430 to prevent debris ingress.

With reference back to FIG. 1, a leading ramp assembly 140 is configured to transmit applied torque from the motor 114 to the adjuster ramp assembly 120 via at least one ramp ball 142 longitudinally interposed between the actuated and adjuster ramp assemblies 140 and 120. The leading ramp assembly 140 and at least one ramp ball 142 are located substantially within the mechanism cavity 110. The adjuster ramp assembly 120 and the leading ramp assembly 140 are mechanically biased longitudinally toward each other with the ramp balls 142 interposed longitudinally therebetween, under influence, for example, of at least one of spring 536, thrust bearing 144 (which serves to facilitate rotation of the leading ramp assembly 140), and support 146. The thrust bearing 144 helps to facilitate rotation of the leading ramp assembly 140 with respect to support 146 which, in some use environments, is configured to support the clamp load developed by the apparatus 100. The leading ramp assembly 140 includes leading ramp 648.

Through use of the ball ramp (comprising adjuster ramp 222, at least one ramp ball 142, and leading ramp 648), spindle 126, and other components of the electromechanical brake apparatus 100, a predetermined amount and direction of torque may be applied from the motor 114 to each of the adjuster ramp assembly 120 and the leading ramp assembly 140, via the gearless unit 538. That is, the leading ramp assembly 140 receives stepped-up torque from the motor 114 via the motor output shaft 118 and a ball thrust bearing 144 (comprising a portion of the gearless unit 538) which is at least partially located radially between the motor output shaft 118 and a leading ramp 648 of the leading ramp assembly 140. The term "radially" is used herein to indicate a direction which is perpendicular to the longitudinal direction.

This predetermined amount and direction of torque may be used, to assist with a selected one of (1) service brake application and (2) service brake release functions by the electromechanical brake apparatus 100. That is, the electromechanical brake apparatus 100 is operative, at different times, to perform both of these listed functions. This predetermined amount and direction of torque may also be used to assist with a selected one of (3) pad wear adjustment and (4) pad replacement functions. That is, the electromechanical brake apparatus 100 is operative, at different times, to perform all four of these listed functions. It is contemplated, though, that only one of the performed functions will be performed at any chosen time, though they may each be performed as often as desired, for any desired duration, and in any desired sequence.

FIGS. 6A-6E schematically depict five different use conditions during the operative duty cycle of the ball ramp portion of the electromechanical brake apparatus 100. In FIGS. 6A-6E, the "counterclockwise" direction (as viewed from the right to the left side, within the plane of the page of FIG. 1) is represented by the upward facing arrows, while the "clockwise" direction is represented by the downward facing arrows. The left facing arrows represent a longitudinal expansion of the adjuster ramp 222 and leading ramp 648 away from each other under the influence of the ramp balls 142 and the known inward facing contours of those ramp discs.

Figure 6A:
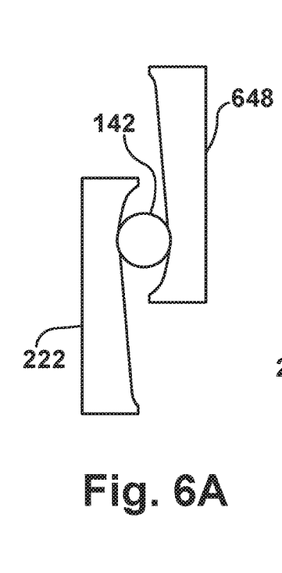
FIGS. 6A-6E schematically depict components of the electromechanical brake apparatus of FIG. 1 in a sequence of example operating conditions.
Figure 6B:
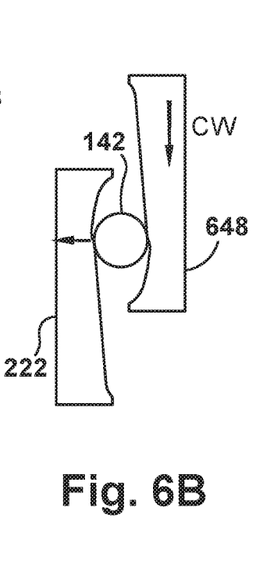

In FIG. 6A, the ramps are in a "home" or neutral position, such as when the brakes are not applied. In FIG. 6B, the leading ramp assembly 140 moves clockwise, to start the service brake application function with a "jump-out" (fast take-up of airgap). The clutch 224 on the adjuster ramp assembly 120 prevents rotation of the adjuster ramp 222, to assist with moving the ball ramp assembly to the position of FIG. 6B. In order to jump out, a predetermined amount of torque is applied, which may depend upon factors such as the compression of spring 536. So, in order to jump out, the clutch 224 should be set to rotate above the amount of torque required to further compress the spring 536.

Figure 6C:
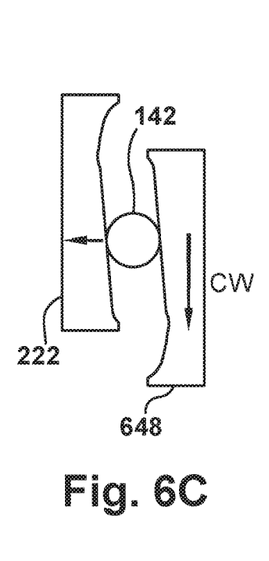

Depending on pad wear, clamp force may or may not be generated in the FIG. 6B position. In FIG. 6C, the leading ramp assembly 140 has moved even further clockwise than in FIG. 6B, pushing the adjuster ramp assembly 120 longitudinally toward the inboard pad 104 to apply the brake. The sequence of FIGS. 6B-6C is reversed to at least partially (or, depending upon pad wear, fully) release the service brake function. The sequence of FIGS. 6A-6B is reversed to fully release the service brake function and to generate air gap to reduce brake drag. It should be noted that, under high loads, forces in the electromechanical brake apparatus 100 sufficient to backdrive the motor unit 112 may be developed, but the ramp positioning and dynamics shown in FIG. 6D can help to "protect" or "reset" the air gap in the system. It will be desirable to preserve an air gap throughout operation of the electromechanical brake apparatus 100, in certain special events, to avoid development of an unwanted "air hammer" type percussion effect in the apparatus 100, which could damage the components thereof.

In all phases of operation of the electromechanical brake apparatus 100, it is contemplated that torque from the motor 114 could be provided at any desired magnitude and directionality, and the gearless gearbox system 112 could be controlled to transform the torque provided from the motor 114 as needed into a motive torque having the magnitude and directionality appropriate for the desired operation of the electromechanical brake apparatus 100. For example, the contact points of at least one thrust ball 116 with first race 112A, second race 112B, leading ramp 648 and support 146 could be adjusted appropriately to achieve desired torque.

Repeated braking events will cause the brake pads 104 and 106 to wear away. Thus, the rotation used to start clamp force generation in FIG. 6C increases over time. If the position of the ball ramp assembly 140 on the spindle 126 is not adjusted for pad wear, the rotation needed to generate a desired clamp force may increase from the position shown in FIG. 6C to one more similar to FIG. 6E, which will be undesirable in most use environments. Pad wear adjustment (using a rotation scheme such as that shown in FIG. 6D) may be performed as frequently as desired, optionally being controlled by some pad wear indicator or value. It is also desirable, in some use environments, for the pad wear adjustment to be performed automatically so as to be an invisible or transparent process for the vehicle operator.

Figure 6D:
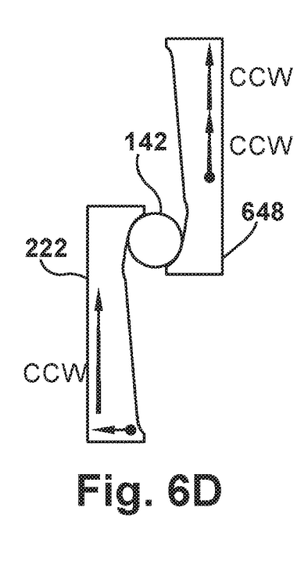

With reference to FIG. 6D, the leading ramp assembly 140 is rotated in the counterclockwise direction up to the end of the ramp tracks of both the leading and adjuster ramp assemblies 140 and 120, and then even further counterclockwise rotation causes the adjuster ramp assembly 120, the leading ramp assembly 140, and the ramp balls 142 to rotate counterclockwise with respect to the spindle 126. Accordingly, the threadable connection between the spindle 126 and the adjuster ramp assembly 120 causes the spindle 126 to move longitudinally away from the adjuster ramp assembly 120 to push the inboard pad 104 longitudinally away from the mechanism cavity 110 and toward rotor 108, and thus compensate for wearing away of the inboard and/or outboard pads 104 and 106.

Figure 6E:
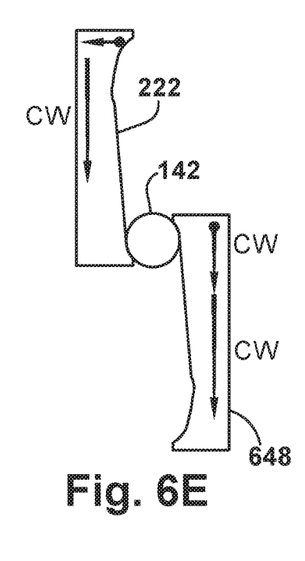

To replace worn pads, first the electromechanical brake apparatus 100 should be moved (e.g., rotated) out engagement with the brake pads 104 and 106. Next, a service tool (not shown) could be used to prevent the flange 432 from rotation. Then, and as shown in FIG. 6E, clockwise rotation of the leading ramp assembly 140 up to the end of the ramp tracks occurs, and then even further clockwise rotation causes the leading ramp assembly 140, the adjuster ramp assembly 120, and the ramp balls 142 to rotate clockwise together with respect to the spindle 126. Accordingly, the threadable connection between the spindle 126 and the adjuster ramp assembly 120 causes the spindle 126 to move longitudinally toward the adjuster ramp assembly 120 to assist with replacement of the inboard and/or outboard brake pads 104 and 106.

FIGS. 6A-6E have been summarized above in a very simple, schematic depiction and description of operation of the electromechanical brake apparatus 100. FIGS. 7-11 will aid the corresponding description below regarding the operation of the electromechanical brake apparatus 100 as a whole to perform the four braking operation functions outlined previously, under influence of the adjuster and leading ramp assemblies 120 and 140 and ramp balls 142.

FIGS. 7-11 each schematically depict a different phase of operation of a system 950 including the electromechanical brake apparatus 100. For consistency of description, rotational motion within the plane of the page will be described as seen by an observer looking from the right toward the left side of each Figure, but one of ordinary skill in the art will understand that a "clockwise" or "counterclockwise" direction, as referenced herein, would be reversed or apparently linear, depending upon the position of the observer.

The system 950 includes a controller 952. The controller 952 is configured to selectively control actuation direction and magnitude of torque applied to the electromechanical brake apparatus 100 by the motor 114, for example, by controlling one or more of the motor 114 and the gearless gearbox system 112. A position sensor 954 may be associated with the motor 114. The position sensor 954, when present, may provide motor position information to the controller 952. The controller 952 may determine a pad wear value responsive to the motor position information, among other functions of the controller 952 and/or the position sensor 954; the pad wear value determination will be discussed below. When a pad wear value is determined, the controller 952 may control the motor 114 to selectively adjust a longitudinal position of the spindle 126 responsive to the pad wear value.

Figure 7:
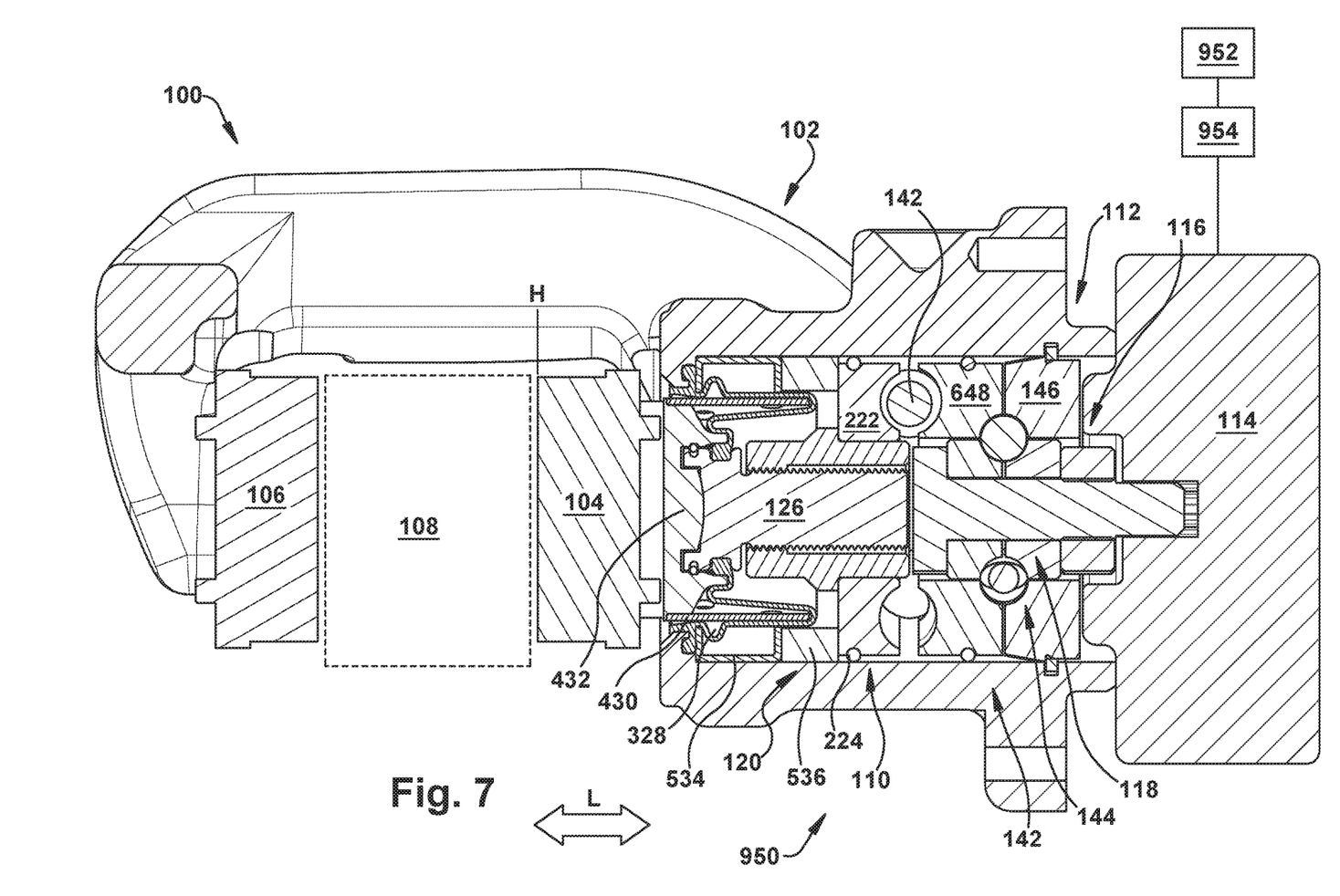
FIGS. 7-11 schematically depict the electromechanical brake apparatus of FIG. 1 in a sequence of example operating conditions.

As shown in FIG. 7, the output shaft 118 from the motor 114 is rotating in a clockwise direction, which drives the leading ramp assembly 140 in the clockwise direction, as well, due to the mechanical connection therebetween. That is, the leading ramp assembly 140 can be considered to be at least partially moving in a first rotary direction with respect to a central axis of the spindle 126. The adjuster ramp assembly 120, following the leading ramp assembly 140, will move substantially longitudinally leftward to assist with the service brake application function, in the orientation of FIG. 7, in the direction of application arrow "A" shown in this Figure. Here, the ball ramp will start in the position of FIG. 6A, and move through the "jump-out" position of FIG. 6B and into the brake application direction of FIG. 6C, where the adjuster ramp 222 and leading ramp 648 move longitudinally apart. Because the adjuster ramp assembly 120 is operatively connected to the inboard pad 104, motion of the adjuster ramp 222 in application direction A will cause the front face of inboard pad 104 to move in that same direction, from an initial point denoted by line H in FIG. 7.

Once a desired clamp force is developed (which could be determined through the use of one or more force sensors, not shown, and/or through motor 114 current draw), torque provided by the motor 114 is controlled to "hold" the inboard and outboard brake pads 104 and 106 against the rotor 108 interposed longitudinally therebetween at a desired clamp force. When clamp load or force is developed, increased load in the threads between the spindle 126 in the adjuster ramp assembly 120 also prevents rotation of the adjuster ramp 222 and/or the spindle 126. For example, because threads have sliding friction while balls have rolling friction, the ball ramp will rotate with less torque than a threaded interface. Thus, the spindle 126 will not rotate with respect to the adjuster ramp 222. This facilitates movement of the ball ramps between the positions shown in FIGS. 6B-6D. If flange 432 were not prevented from moving once some clamp load is developed, then further clamp force would not be developed.

It is contemplated that the controller 952, the position sensor 954, or any other component of the electromechanical brake apparatus 100 or system 950 could record or "tare" a "home" position of the motor 114 (or one or more components thereof), the output shaft 118, the leading ramp assembly 140 (or one or more components thereof), the inboard brake pad 104, or any other component of the electromechanical brake apparatus 100 before the brake application commences or at any desired other time during application of the brake, in order to provide a baseline value to aid with tracking pad wear. For example, the controller 952 could "memorize" the amount of rotation of the output shaft 118 needed to achieve a desired clamp force when the inboard and/or outboard brake pads 104 and 106 are relatively new, and then later compare that to a needed rotation to "take up" the air gap between the inboard pad 104 and the rotor 108 once the inboard pad 104 has worn down through repeated applications, to determine a pad wear value.

Figure 8:
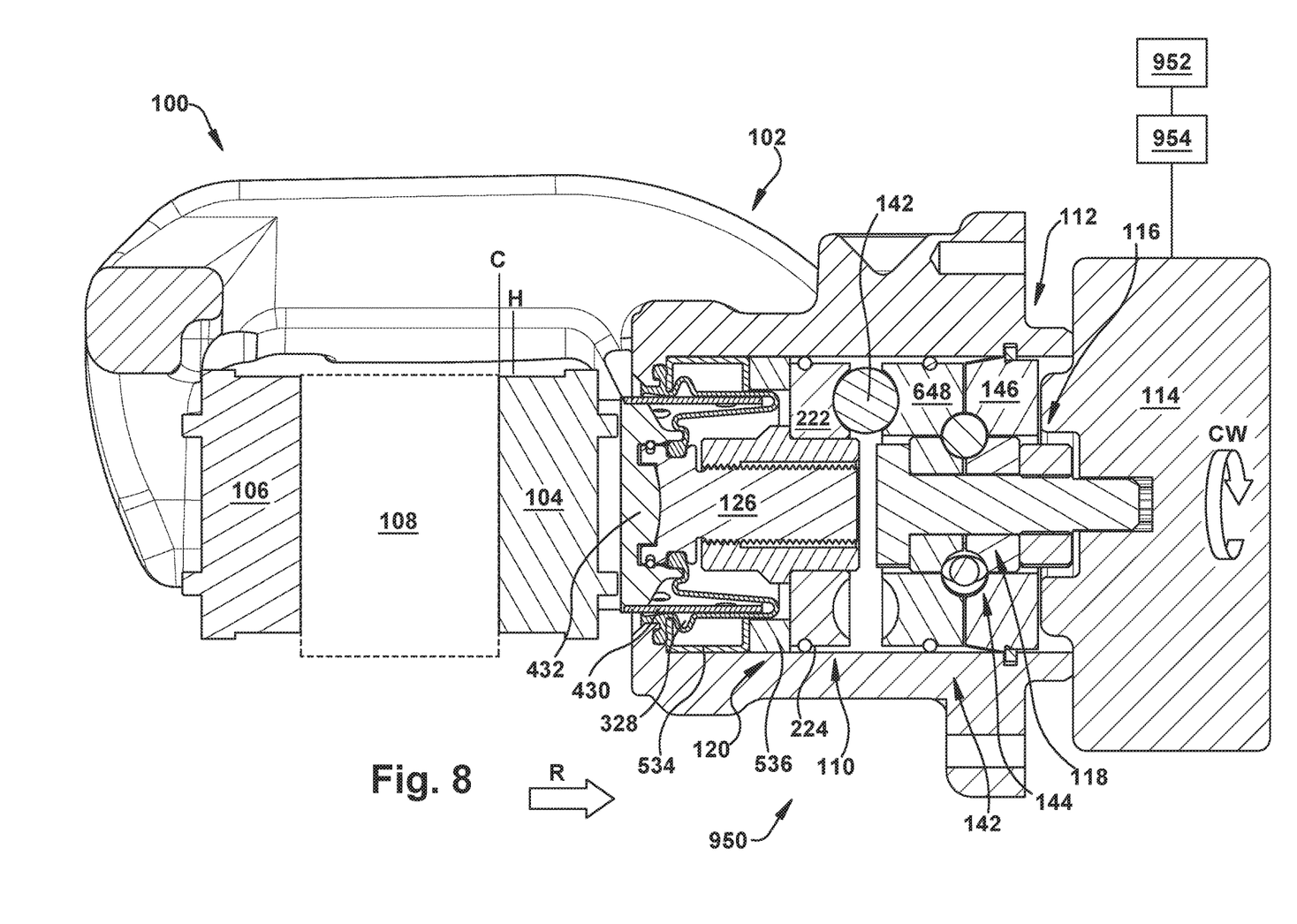

Turning now to FIG. 8, to release clamp force, the output shaft 118 from the motor 114 is rotating in a counterclockwise direction, which may drive the leading ramp assembly 140 in the counterclockwise direction, as well, due to the mechanical connection therebetween. That is, the leading ramp assembly 140 can be considered to be at least partially moving in a second rotary direction (which is counterclockwise, as shown herein) with respect to a central axis of the spindle 126, opposite the first rotary direction (which is clockwise, in this example schematic depiction). The adjuster ramp assembly 120, following the leading ramp assembly 140, will move substantially longitudinally rightward to assist with the service brake release function, in the orientation of FIG. 8, in the direction of retraction arrow "R" shown in this Figure. Here, the ball ramp will start a position similar to that shown in FIG. 6C, and move through the "jump-out" position of FIG. 6B and into the home position of FIG. 6A, where the adjuster ramp 222 and leading ramp 648 move longitudinally toward one another along that sequence. Because the adjuster ramp assembly 120 is operatively connected to the inboard pad 104, motion of the adjuster ramp 222 in retraction direction R will cause the front face of inboard pad 104 to move in that same direction, from a clamp position denoted by line C in FIG. 8 toward the initial position, H.

Once the clamp force is released as desired (which could be determined through the use of one or more force sensors, not shown, and/or motor 114 current draw), the controller 952 will command-motor 114 to return to home position as shown in FIG. 6A. When such home position is achieved, electrical power to the motor 114 is turned OFF. The inboard and outboard brake pads 104 and 106 are then held in a "home" position until the next brake application is to be performed. Continued retraction of the adjuster ramp assembly 120 is facilitated through use of the spring 536 to provide sufficient force to help urge the adjuster ramp assembly 120 toward the "home" position.

As previously mentioned, the controller 952 or any other portion of the system 950 could have recorded a "tare" or "home" position of the motor 114, planetary gear system 112, output shaft 118, or any other portion of the electromechanical brake apparatus 100 to record a baseline value for pad wear. The controller 952 or any other portion of the system 950 could record and determine the adjusted value for pad wear at a predetermined time interval or apparatus event, such as upon every service/parking brake event application. If the difference between the adjusted pad wear value and the baseline pad wear value reaches a predetermined amount, the controller 952 or any other portion of the system 950 can alert an operator that the pad needs to be adjusted, but in most use environments will simply carry out the pad adjustment at a predetermined time during the use cycle of the electromechanical brake apparatus 100 (for example, when the electromechanical brake apparatus 100 is in the home position or otherwise when the adjustment will not interfere with normal brake use—such as, but not limited to, when the vehicle is parked, transmission selector is moved to P or N, and/or the key ignition is turned to OFF). One example of a physical characteristic of the system 950 which can provide an indication of the amount of pad wear that has occurred is how much rotational motion of the output shaft 118 is needed to develop a predetermined amount of clamp force. One of ordinary skill in the art will be readily able to provide one or more additional or alternative schemes for determining when an actionable amount of pad wear has occurred.

Figure 9:
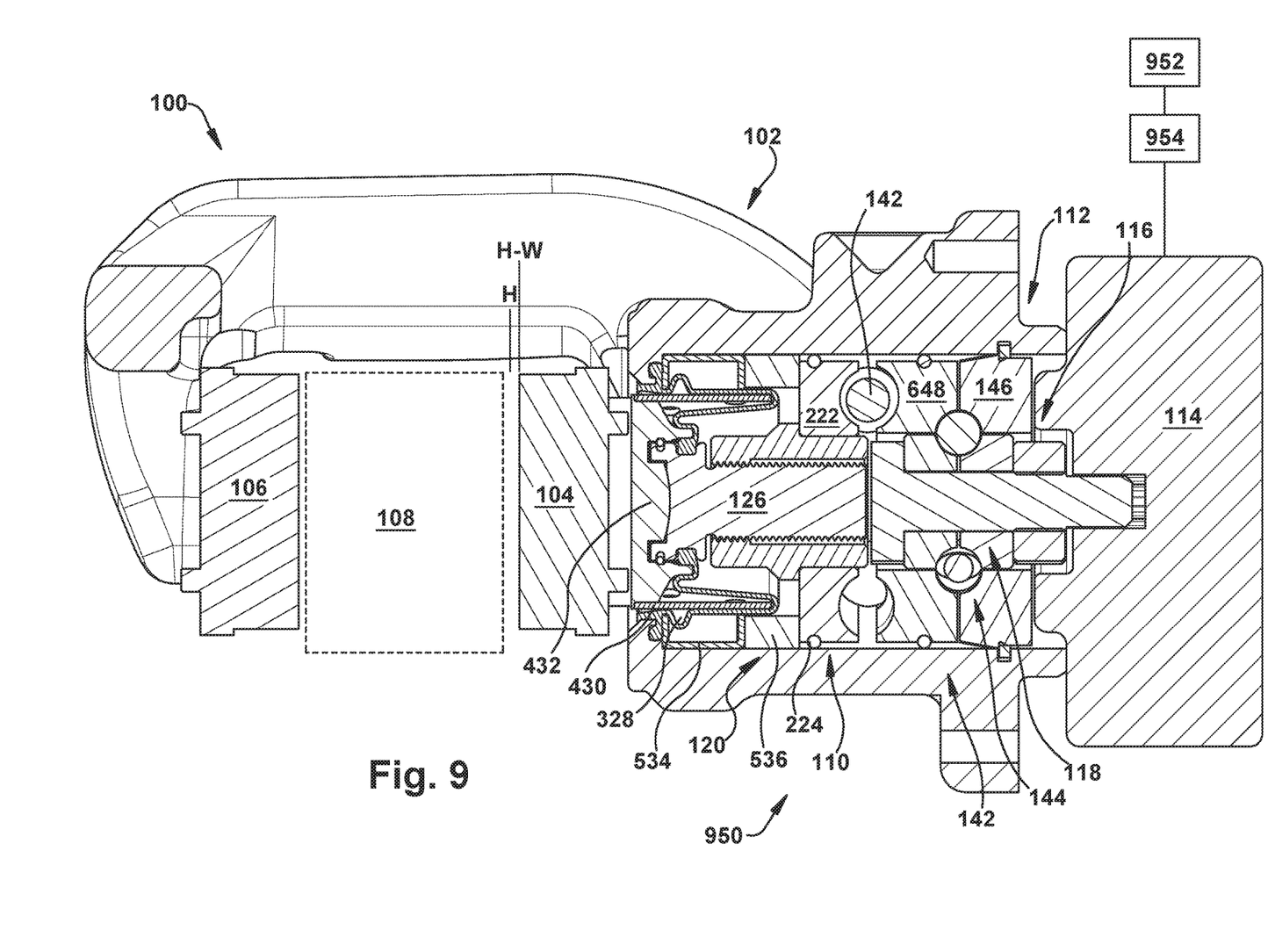
Figure 10:
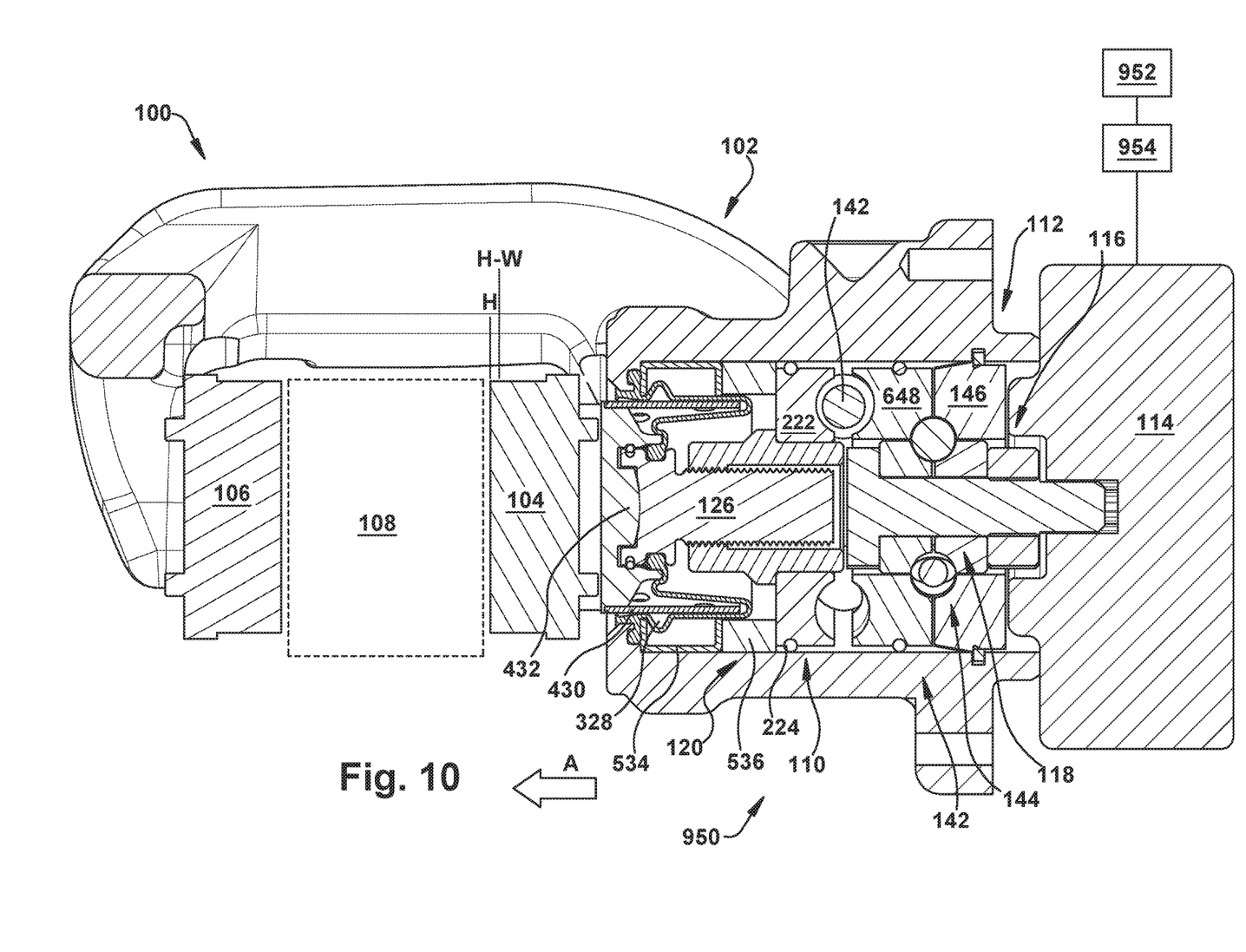

One example pad wear adjustment scheme is shown in the sequence of FIGS. 9-10. In these Figures, the face of the inboard pad 104 has worn such that it no longer is located at line H in the home position, but is at line "H-W". For the sake of description, it will be presumed that the distance between line H and line H-W connotates sufficient pad wear to trigger a manual and/or automated pad wear adjustment, which could be carried out at any desired timing (e.g., the earliest opportunity under the aforementioned example conditions) using the following procedure. In FIG. 9, the output shaft 118 from the motor 114 is rotating in a counterclockwise direction, which drives the leading ramp assembly 140 in the counterclockwise direction, as well, due to the mechanical connection therebetween. That is, the leading ramp assembly 140 can be considered to be at least partially moving in a second rotary direction (which is counterclockwise, as shown herein) with respect to a central axis of the spindle 126, opposite the first rotary direction (which is clockwise, in this example schematic depiction). The adjuster ramp assembly 120, following the leading ramp assembly 140, will move substantially longitudinally rightward as if it were assisting with the service brake application function. However, here the ball ramp will start in the position of FIG. 6A, and move to the pad adjustment end of ramp position of FIG. 6D. The stroke between positions in FIGS. 6A and 6D may be, for example, about 0.3 mm.

Further counterclockwise (as shown here) rotation of the leading ramp assembly 140 in the second rotary direction (counterclockwise, as referenced herein) from the position shown in FIG. 6D will cause the adjuster ramp assembly 120, the leading ramp assembly 140, and the ramp balls 142 to rotate together in a unitary fashion in the second rotary direction (e.g., clockwise, as shown here).

As a result, the adjuster ramp 222 rotates with respect to the spindle 126. Since the spindle 126 cannot rotate due to its interlock with the inboard pad 104, the spindle will move in direction A, as shown in FIG. 12, until the inboard pad 104 contacts the rotor 108, i.e. air gap is eliminated. This contact is detected by controller 952 and/or system 950 through an increase in load by the force sensor (not shown) and/or an increase in current draw by the motor 114. This will result in the inboard pad 104 being pushed longitudinally away from the adjuster ramp 222, to compensate for the pad wear, and, upon return of the leading ramp assembly to "home" position as shown in FIG. 6A. thus urging the inboard pad 104 into the position shown in FIG. 10, with the front face at line H, the air gap is reset to a desired air gap, for example about 0.3 mm.

In other words, the leading ramp assembly 140 at least partially moves in the second rotary direction with respect to the spindle 126, opposite the first rotary direction. The adjuster ramp assembly 120 then also at least partially moves in the second rotary direction relative to the spindle 126, responsive to a predetermined amount of rotation by the leading ramp assembly 140, to assist with the pad wear adjustment function. The spindle 126 is threadably connected with the adjuster ramp assembly 120, such that the spindle moves longitudinally due to the threadable connection, responsive to movement of the adjuster ramp assembly 120 in the second rotary direction. When the ball ramp returns to the home position of FIG. 6A, there will be an air gap (e.g., of about 0.3 mm in some use environments) generated immediately after pad wear adjustment.

Once the inboard pad 104 is advanced further in the application direction A to contact the rotor 108, some clamp force is developed. The controller 952 turns off the motor 114 as a predetermined amount of clamp force is reached. Since the electromechanical brake apparatus 100 is not locked in position during the pad wear adjustment sequence, the combination of clamp force, force from biasing spring 536, and any other suitably applied force will back drive the mechanism of the electromechanical brake apparatus 100 toward the home position, as shown in FIG. 10. It should be noted that the leading ramp assembly 140 rotates clockwise, and both the adjuster ramp assembly 120 in the spindle 126 move longitudinally in the retraction direction R during such a conclusion of a wear adjustment operation.

Figure 11:
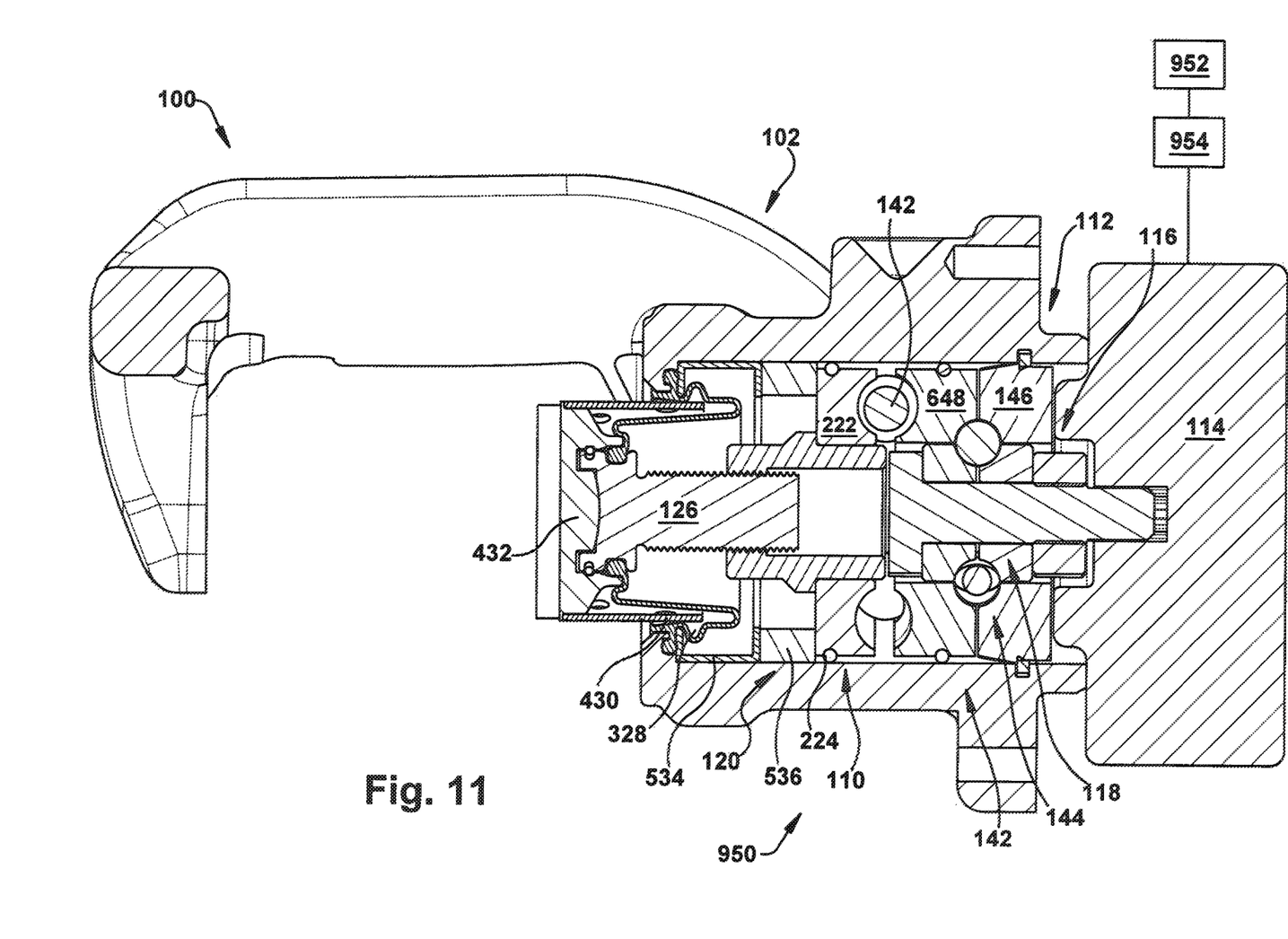

Finally, FIG. 11 schematically depicts a situation in which the electromechanical brake apparatus 100 is undergoing a pad replacement operation. In this Figure, the electromechanical brake apparatus 100 is rotated out of the way so that the flange 432 is no longer engaged by the inboard brake pad 104. A service tool may be located between the flange 432 and the housing 102 fingers, which prevents rotation of the flange 432 throughout the pad replacement operation. Here, the leading ramp assembly 140 at least partially moves in the first rotary direction (clockwise, in the orientation of the Figures) with respect to the spindle 126, to an extent that the ramp balls 142 reach the furthest extent of their travel that direction and begin to force the adjuster ramp assembly 120 to at least partially move in the first rotary direction, as well, responsive to that predetermined amount of rotation by the leading ramp assembly 140. This action, shown schematically in FIG. 6E, may assist with a pad replacement function by "screwing" the spindle 126 inward toward motor unit 112 (toward the right side of the page, in FIG. 11) until the unthreaded portion of the spindle 126 stops against adjuster ramp 222. The boot 328 may be sufficiently flexible to at least partially extend or evert, as shown in FIG. 11, during the pad replacement operation to maintain sealing of the mechanism cavity 110 or for any other reason. At this time, the motor unit 112 rotates the input shaft 118 in the counterclockwise direction to bring the ball ramp assembly into the position shown in FIG. 6A, and then electrical power to the motor 114 is turned OFF. The worn pads may be replaced with new pads on the bracket (not shown), and the electromechanical brake apparatus 100 is rotated back into place with attention to aligning the groove on the flange 432 with the tabs on the inboard pad 104 to prevent rotation of the flange 432. At this point, the pad replacement is completed. A pad wear adjustment operation may be performed to reset the position of the spindle 126 with respect to the new, unworn brake pad prior to normal brake operation. One of ordinary skill in the art will be able to provide any desired control and/or mechanical arrangement to facilitate such replacement, for a particular electromechanical brake apparatus 100.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. An electromechanical brake apparatus, comprising:
a housing supporting an inboard brake pad and an oppositely facing outboard brake pad for selective frictional contact with a rotor interposed longitudinally therebetween, the housing including a mechanism cavity located longitudinally between the inboard pad and a motor having a motor output shaft;
an adjuster ramp assembly indirectly receiving torque from the motor;
a spindle for selectively moving the inboard brake pad longitudinally, the spindle being operatively connected with the adjuster ramp assembly to indirectly receive torque from the motor therethrough, the spindle and adjuster ramp assembly being located substantially within the mechanism cavity; and
a leading ramp assembly configured to transmit applied torque from the motor to the adjuster ramp assembly, the leading ramp assembly receiving stepped-up torque from the motor via the motor output shaft and a ball thrust bearing at least partially located radially between the motor output shaft and an actuator ramp of the leading ramp assembly;
wherein a predetermined amount and direction of torque is applied to each of the adjuster ramp assembly and the leading ramp assembly to assist with a selected one of (1) service brake application and (2) service brake release functions, the electromechanical brake apparatus being operative, at different times, for both functions.

2. The electromechanical brake apparatus of claim 1, wherein the spindle is threadably connected with the adjuster ramp assembly.

3. The electromechanical brake apparatus of claim 1, wherein the leading ramp assembly is configured to transmit applied torque from the motor to the adjuster ramp assembly via at least one ramp ball longitudinally interposed therebetween, the leading ramp assembly and at least one ramp ball being located substantially within the mechanism cavity.

4. The electromechanical brake apparatus of claim 1, including a boot located longitudinally between the inboard pad and the adjuster ramp assembly, the boot substantially preventing ingress of material into the mechanism cavity.

5. The electromechanical brake apparatus of claim 4, including a shield interposed longitudinally between the boot and the inboard pad, the shield being connected to the spindle for longitudinal travel therewith and the shield facilitating egress of material from between the boot and the inboard pad.

6. The electromechanical brake apparatus of claim 3, wherein the adjuster ramp assembly and the leading ramp assembly are mechanically biased longitudinally toward each other with the ramp balls interposed longitudinally therebetween.

7. The electromechanical brake apparatus of claim 1, wherein the leading ramp assembly at least partially moves in a first rotary direction with respect to the spindle and the adjuster ramp assembly moves substantially longitudinally to assist with the service brake application function.

8. The electromechanical brake apparatus of claim 7, wherein
the leading ramp assembly at least partially moves in a second rotary direction with respect to the spindle, opposite the first rotary direction, and the adjuster ramp assembly moves substantially longitudinally to assist with the service brake release function.

9. The electromechanical brake apparatus of claim 1, wherein a predetermined amount and direction of torque is applied to each of the adjuster ramp assembly and the leading ramp assembly to assist with a selected one of (1) service brake application, (2) service brake release, (3) pad wear adjustment, and (4) pad replacement functions, the electromechanical brake apparatus being operative, at different times, for all four functions.

10. The electromechanical brake apparatus of claim 9, wherein the leading ramp assembly at least partially moves in a first rotary direction with respect to the spindle and the adjuster ramp assembly moves substantially longitudinally to assist with the service brake application function, and
wherein the leading ramp assembly at least partially moves in a second rotary direction with respect to the spindle, opposite the first rotary direction, and the adjuster ramp assembly at least partially moves in the second rotary direction relative to the spindle, responsive to a predetermined amount of rotation by the leading ramp assembly, to assist with the pad wear adjustment function.

11. The electromechanical brake apparatus of claim 10, wherein the spindle is threadably connected with the adjuster ramp assembly and wherein the spindle moves longitudinally due to the threadable connection, responsive to movement of the adjuster ramp assembly in the second rotary direction.

12. The electromechanical brake apparatus of claim 9, wherein
the leading ramp assembly at least partially moves in a first rotary direction with respect to the spindle and the adjuster ramp assembly at least partially moves in the first rotary direction, responsive to a predetermined amount of rotation by the leading ramp assembly, to assist with the pad replacement function.

13. The electromechanical brake apparatus of claim 1, wherein there are no gears mechanically interposed between an output shaft of the motor and the inboard pad.

14. A system including the electromechanical brake apparatus of claim 1, the system comprising a controller, the controller being configured to selectively control actuation direction and magnitude of torque applied to the electromechanical brake apparatus by the motor.

15. The system of claim 14, including a position sensor associated with the motor, the position sensor providing motor position information to the controller, the controller determining a pad wear value responsive to the motor position information, and the controller controlling the motor to selectively adjust a longitudinal position of the spindle responsive to the pad wear value.

* * * * *